under 35 U.S.C. 154(b) by 210 days.

United States Patent
Backes

(10) Patent No.: US 11,255,782 B2
(45) Date of Patent: Feb. 22, 2022

(54) ELECTRO-OPTICAL ASSEMBLY AND METHOD FOR DETECTING AMBIENT LIGHT

(71) Applicant: BCS AUTOMOTIVE INTERFACE SOLUTIONS GMBH, Radolfzell (DE)

(72) Inventor: Ulrich Backes, Radolfzell (DE)

(73) Assignee: BCS AUTOMOTIVE INTERFACE SOLUTIONS GMBH, Radolfzell (DE)

( * ) Notice: Subject to any disclaimer, the term of this patent is extended or adjusted under 35 U.S.C. 154(b) by 210 days.

(21) Appl. No.: 16/480,140

(22) PCT Filed: Jan. 18, 2018

(86) PCT No.: PCT/EP2018/051170
§ 371 (c)(1),
(2) Date: Jul. 23, 2019

(87) PCT Pub. No.: WO2018/137989
PCT Pub. Date: Aug. 2, 2018

(65) Prior Publication Data
US 2019/0353591 A1 Nov. 21, 2019

(30) Foreign Application Priority Data
Jan. 27, 2017 (DE) ...................... 10 2017 101 655.4

(51) Int. Cl.
*G01N 21/552* (2014.01)
*G01J 1/02* (2006.01)
(Continued)

(52) U.S. Cl.
CPC .......... *G01N 21/552* (2013.01); *G01J 1/0214* (2013.01); *G01J 1/0407* (2013.01); *B60S 1/0837* (2013.01)

(58) Field of Classification Search
CPC ...... G01J 1/0266; G01J 1/0407; G01J 1/0422; G01J 1/4204; G01J 1/0214; G01N 21/552;
(Continued)

(56) References Cited

U.S. PATENT DOCUMENTS

| 4,873,429 A | 10/1989 | Kume et al. |
| 6,573,995 B1 | 6/2003 | Beutner et al. |

(Continued)

FOREIGN PATENT DOCUMENTS

| DE | 19757821 A1 | 7/1999 |
| DE | 10156185 A1 | 5/2003 |

(Continued)

*Primary Examiner* — Kara E. Geisel
*Assistant Examiner* — Amanda Merlino
(74) *Attorney, Agent, or Firm* — McNees Wallace & Nurick LLC

(57) ABSTRACT

An electro-optical assembly, in particular a sensor assembly for detecting ambient light, includes a reflection surface, a lens body and an electro-optical component, in particular a light receiver. The component includes a depression having a main lens section, in particular a diverging lens section with a concave interior wall, and a converging lens section with a convex interior wall. The interior wall of the converging lens section is formed in such a way that the rays of the ray path which travel through the converging lens section to the electro-optical component hit the reflection surface in such way that the angle of incidence at the reflection surface is larger or the same as the critical angle of the total internal reflection at the reflection surface. In another aspect a method for detecting ambient light is described.

20 Claims, 3 Drawing Sheets

(51) Int. Cl.
*G01J 1/04* (2006.01)
*B60S 1/08* (2006.01)

(58) Field of Classification Search
CPC ............ G02B 19/0028; G02B 19/0076; B60S 1/0837; B60S 1/087
See application file for complete search history.

(56) References Cited

U.S. PATENT DOCUMENTS

| | | |
|---|---|---|
| 7,804,055 B2 | 9/2010 | Backes |
| 7,847,255 B2 | 12/2010 | Teder |
| 7,894,054 B2 | 2/2011 | Backes |
| 8,299,434 B2 | 10/2012 | Goto |
| 9,546,900 B2 | 1/2017 | Backes |
| 2003/0160158 A1 | 8/2003 | Ishino et al. |
| 2007/0229247 A1 | 10/2007 | Izumi |
| 2008/0297803 A1 | 12/2008 | Backes |
| 2015/0192460 A1 | 7/2015 | Gohmann et al. |
| 2017/0001600 A1* | 1/2017 | Lee ..................... B60S 1/0837 |
| 2017/0067776 A1* | 3/2017 | Makino ................ G01J 1/0266 |

FOREIGN PATENT DOCUMENTS

| | | |
|---|---|---|
| DE | 102011075597 A1 | 11/2011 |
| DE | 102011108683 A1 | 1/2013 |

* cited by examiner

STATE OF THE ART

ELECTRO-OPTICAL ASSEMBLY AND METHOD FOR DETECTING AMBIENT LIGHT

CROSS REFERENCES TO RELATED APPLICATIONS

This application filed under 35 U.S.C § 371 is a national phase application of International Application Serial Number PCT/EP2018/051170 filed Jan. 18, 2018, which claims priority to German Application No. 10 2017 101 655.4, filed Jan. 27, 2017, the subject matter of which are incorporated by reference in their entirety.

FIELD OF THE DISCLOSURE

The disclosure relates to an electro-optical assembly, in particular a sensor assembly for detecting ambient light, as well as a method for detecting ambient light by means of a sensor assembly.

BACKGROUND

Electro-optical assemblies for detecting ambient light are known, in particular such electro-optical assemblies for vehicles that measure the ambient light in the environment of the vehicle.

Such a sensor assembly for an ambient light sensor from the prior art is shown in FIG. 1. The sensor assembly 2 typically comprises a lens body 4 and a light receiver 6.

A depression that forms a lens with the opposing side of the lens body 4 is provided in the lens body 4 on the side facing the light receiver 6. This lens acts as a diverging lens so that light rays are focused from a very wide angular range through the lens body 4 on the light receiver 6.

In general, however, the lens body 4 is not only used for focusing the ambient light on the light receiver 6, but also forms a lens for other functions of the electro-optical assembly, i.e. a rain sensor function. For this purpose, additional depressions 9 are provided in the example shown. As a result of the depression 9, stray light $S_S$ is refracted on the depression 8 and thus in the light receiver 6, thereby impairing the measurement of the light receiver 6.

To effectively prevent this stray light, it is known, for example, that the depression 8 is made nontransparent at some points so that the stray light $S_S$ cannot reach the light receiver 6.

The solution is however complicated to manufacture as the depression must be made nontransparent at the right points, for example by applying a nontransparent film.

SUMMARY

Thus, there is a need to provide an electro-optical assembly as well as a method for detecting ambient light by means of a sensor assembly, by means of which incident light from unwanted angular ranges can be blocked out easily, i.e. does not reach the light receiver.

The object is solved by means of an electro-optical assembly, in particular a sensor assembly for detecting ambient light, comprising a reflection surface, a lens body and an electro-optical component, in particular a light receiver. The lens body comprises an ambient side, a component side and a lens section, wherein a depression in the lens body extending from the component side is provided in the lens section, said depression forms together with the reflection surface in the lens section a lens for the electro-optical component. The depression comprises a main lens section, in particular a diverging lens section with a concave interior wall, and a converging lens section with a convex interior wall, wherein the interior wall of the converging lens section is formed in such a way that the rays of the ray path which travel through the converging lens section to the electro-optical component hit the reflection surface in such way that the angle of incidence at the reflection surface is larger or equal to the critical angle of the total internal reflection at the reflection surface.

To this end, the angle of incidence is defined, as usual, as the angle between the incident ray and the perpendicular to the interface, here therefore the perpendicular to the reaction surface. The total internal reflection is thus based on the interface between air and the material at the reflection surface. To this end, the reflection surface and the interior wall of the depression are the refracting surfaces of the lens formed by the lens section.

The main lens section can be a diverging lens section comprising a concave interior wall, but also a section that acts as a converging lens, however with another focal length as the converging lens section.

The disclosure is based on the knowledge that it is not necessary to black out or make certain parts of the depression nontransparent in order to block out a certain angular range, but rather that it is possible by means of the contour of the interior wall of the depression to prevent light incidence from certain angular ranges at the light receiver.

To this end, the physical phenomenon of total internal reflection is used, exploiting that the rays of a ray path that experience total internal reflection at an interface do not have parts outside the medium.

As an illustration, the electro-optical component is viewed as a light source, wherein the converging lens section of the depression is formed in such a way that the rays that travel through the converging lens section are completely reflected at the reflection surface (total internal reflection) so that no part of these rays emerge from the lens body. Thus, no light in the angular range to be blacked out is refracted, which also means that no light from the angular range to be blocked out can reach the electro-optical component.

It is therefore not necessary to black out or darken certain points of the depression of the lens body.

The depression itself can be a free form which can be selected afterwards, among other things, from which angular ranges a particularly large amount of light is to reach the electro-optical component and vice versa.

For example, the ambient side of the lens body forms the reflection surface, thereby making it possible to provide a very compact electro-optical assembly.

In another embodiment of the disclosure, the electro-optical assembly comprises a pane, in particular the windshield of a vehicle, on which the lens body is mounted, wherein the side of the pane facing away from the electro-optical component forms the reflection surface. Here, the ambient side of the lens body faces the pane. In this case, the material at the reflection surface is the material of the pane. As a result, the electro-optical assembly can be built directly into a vehicle or the form of the depression can be adapted to the windshield of the vehicle. The mounting of the lens body on the pane is carried out, for example, by means of a transparent silicone layer between the lens body and the pane. Thus, the lens body is couplable to the pane.

Preferably, the interior wall of the converging lens section is formed in such a way that the rays of the ray path, which travel through the converging lens section to the electro-optical component, travel outside the lens section parallelly, thereby reducing interference by collected stray light further.

In an embodiment of the disclosure, the depression comprises an aperture towards the component side, wherein the depression extends completely within a notional cylinder, whose base area is the aperture of the depression. Therefore, the depression does not form an undercut. The lens body can thus be produced by injection molding or a similar method.

To simplify the demolding of the lens body further, the cross-sectional area of the depression parallel to the component side can become increasingly smaller starting from the component side.

For example, the solid angle covered by the converging lens section is smaller than the solid angle covered by the main lens section. To this end, the solid angle is viewed from the electro-optical component. For example, the ratio of the solid angle of the converging lens section to the solid angle of the main lens section is ¼ or smaller. This ensures that enough light from the environment reaches the electro-optical component and vice versa.

To be able to block out in particular angular ranges at the edge of the field of view of the electro-optical component, the converging lens section and/or the main lens section extend from the component side of the lens body.

In an embodiment of the disclosure, the transition between the main lens section and the converging lens section is abrupt. Here, the contour of the interior wall at the transition is not always continuously differentiable. In this way, the angular range to be blocked out can be clearly separated from the desired angular range.

Preferably, the depression has a vertex, wherein the electro-optical component, in particular the light receiver, is on a straight line that extends through the vertex and perpendicular to the component side of the lens body. The vertex is thus the point of the depression comprising the greatest distance perpendicularly to the component side. Thus, the geometry of the depression can be simplified.

Preferably, the component side, the ambient side and/or the reflection surface are parallel to each other so that the production of the lens body is simplified further. For example, the lens body is plate-like.

In an embodiment of the disclosure, a nontransparent layer is provided on the component side at least partially. The nontransparent layer is located at least partially in the areas in which the depression is not. It can be produced by applying a nontransparent film. The nontransparent layer is therefore only provided on the planar surface of the component side and thus easy to apply. In addition, it prevents unwanted stray light from reaching the electro-optical component.

In a variant, the lens body comprises a further lens section, wherein the converging lens section is formed at least at the point of the depression that is nearest to the additional lens section, thereby preventing interference by stray light from other lens sections.

In an embodiment of the disclosure, the device comprises a housing that surrounds at least the lens body partially, wherein the housing adjoins the lens body laterally. The housing is nontransparent so that no light enters into the lens body through the end sides. This prevents light from entering into the lens body through one of the end sides and being refracted through the converging lens section to the electro-optical component after one or more total internal reflections. The housing can be produced, for example, by coating the lens body.

Moreover, the object is solved by a method for detecting ambient light by means of a sensor assembly comprising a light receiver, a lens body and a reflection surface, wherein a depression in the lens body is formed on the side facing the light receiver and wherein the depression and the reflection surface interact so that incident light on the sensor assembly is blocked out from a predetermined angular range. "Blocked out" means in this regard that light does not reach the light receiver.

For example, the rays of the ray path that extend from the light receiver and that would correspond to the blocked-out light are refracted at the depression in such a way that they are completely reflected at the reflection surface due to total internal reflection.

DESCRIPTION OF THE DRAWINGS

Additional features and advantages of the disclosure are found in the following description as well as the attached drawings to which reference is made. In the drawings.

DETAILED DESCRIPTION

Figure 1:
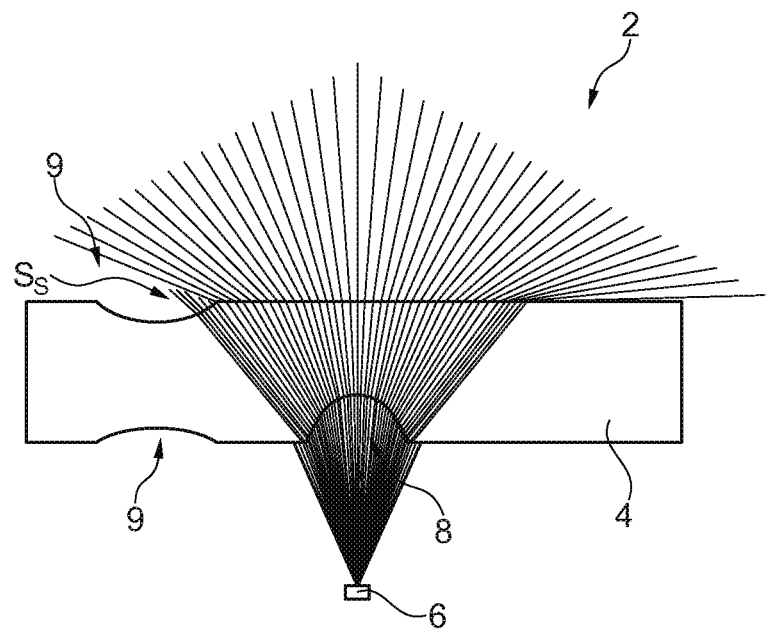
FIG. 1 shows the electro-optical assembly from the prior art.
Figure 2:
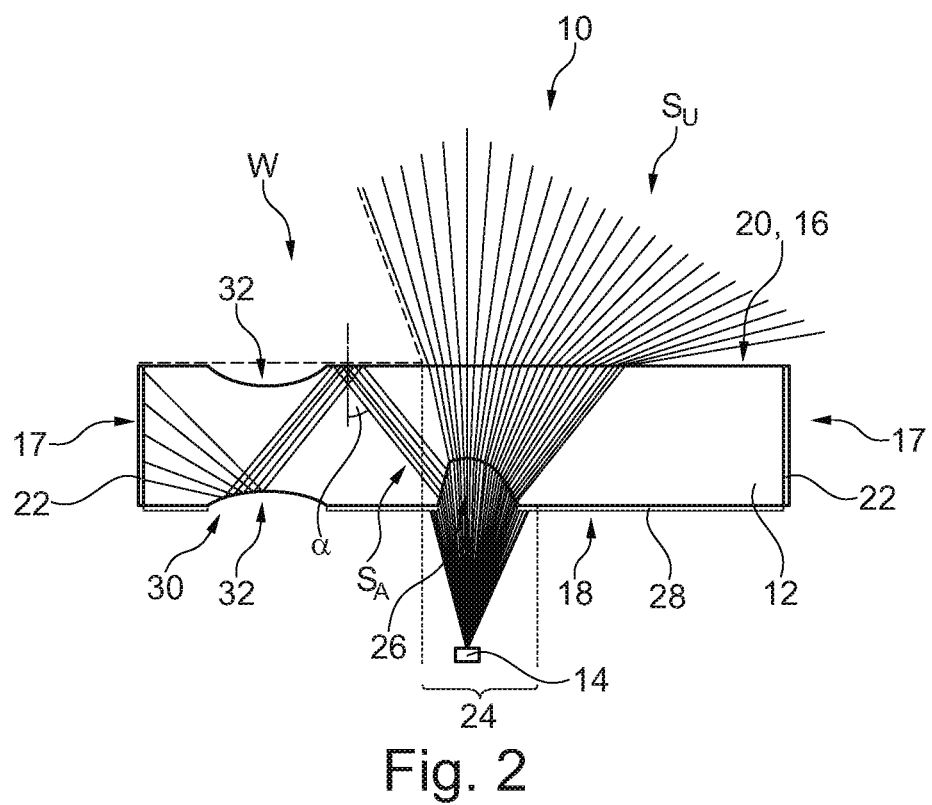
FIG. 2 shows an electro-optical assembly according to the disclosure schematically in section.

In FIG. 2, an electro-optical assembly 10 is shown comprising a lens body 12, an electro-optical component 14 and a reflection surface 16.

The electro-optical component 14 can be a light source or a light receiver, for example a CMOS sensor. In the shown embodiment, the electro-optical component 14 is a light receiver for measuring incoming light on the light receiver. Thus, the electro-optical assembly becomes a sensor assembly for detecting ambient light.

The lens body 12 is produced by means of injection molding from a plastic that is almost transparent in the visible range. The refractive index $n_1$ of the material of the lens body 12 is thus larger than the refractive index $n_L$ of the air.

In the shown embodiment, the lens body 12 is plate-like comprising end sides 17, a component side 18 that faces the electro-optical component 14 and an opposing ambient side 20. The component side 18 and the ambient side 20 are, for example, parallel to each other.

The ambient side 20 of the lens body 12 forms the reflection surface 16 in the shown embodiment.

On the end sides 17, at least the lens body 12 is tightly enclosed by a housing 22 of the electro-optical assembly 10. The housing 22 is thus nontransparent so that no light enters into the lens body 12 through the end sides 17.

The lens body 12 can be coated, for example, with the material of the housing 22 in order to produce the housing 22.

The lens body 12 comprises in addition a lens section 24 in which a depression 26 is formed in the lens body 12 on the component side 18.

Moreover, a nontransparent layer 28 is applied to the component side 18, said nontransparent layer 28 completely covering the component side 18 except for the area of the depression 26.

The nontransparent layer 28 is created, for example, through a heat-sealing method using a nontransparent film.

In addition to the lens section 24, further lens sections 30 can be provided in the lens body 12, said lens sections 30 comprise additional depressions 32 on the component side 18 and/or the ambient side 20 of the lens body 12.

Figure 3:
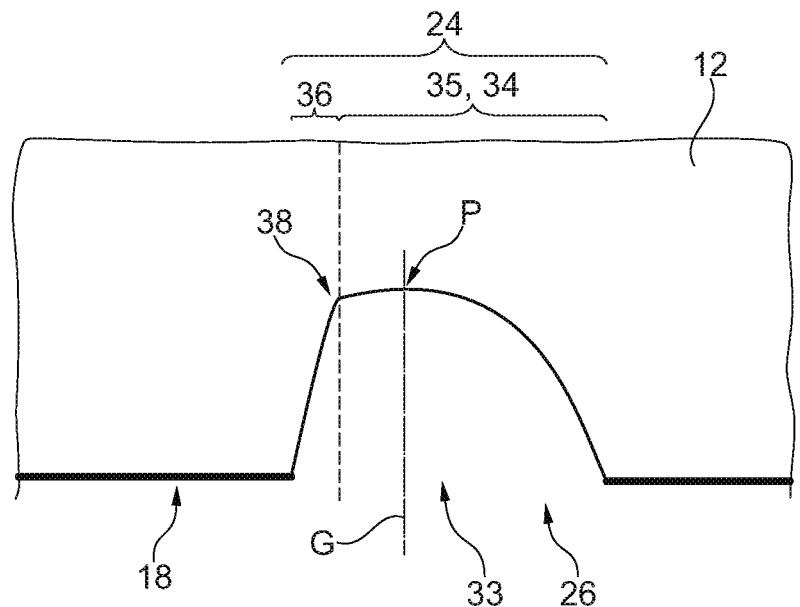
FIG. 3 shows an enlarged view of a part of the electro-optical assembly according to the disclosure according to FIG. 2 in the area of the depression.
Figure 4:
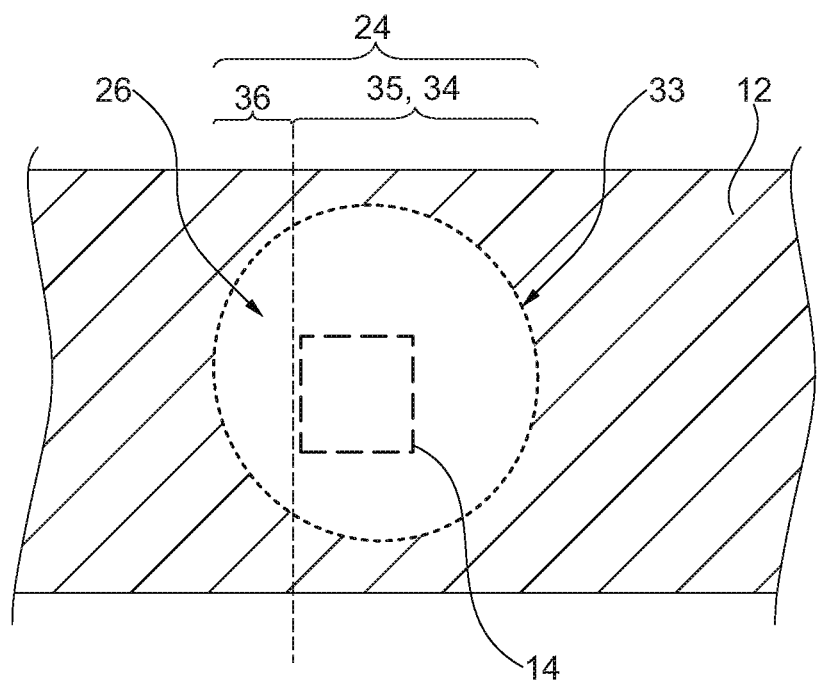
FIG. 4 shows a schematic top view of the electro-optical assembly according to FIG. 2.

In FIGS. 3 and 4, the depression 26 in the lens section 24 is shown enlarged. In FIG. 4, the electro-optical component 14 is shown as a dashed line and the edge of the depression 26 on the component side 18 is shown as a dotted line. The nontransparent layer 28 is indicated by the crosshatching.

The depression 26 opens onto the component side 18 with an aperture 33 that has a substantially oval, elliptical or circular circumference. The aperture 33 may also have another form.

The depression 26 tapers from the component side 18, i.e. that the cross-sectional areas of the depression parallel to the component side 18 become increasingly smaller starting from the component side 18.

No part of the depression 26 thus extends beyond a notional cylinder that has the aperture 33 as its base area.

Thus, no undercut in the lens body 12 is formed by the depression 26.

Moreover, the depression ends at the vertex P which is that point that is the greatest distance perpendicular to the component side 18.

The electro-optical component 14 is thus located on a straight line G that extends through the vertex P and is perpendicular to the component side 18.

The depression 26 comprises a main lens section 35 and a converging lens section 36 that each both extend from the component side 18. The converging lens section 36 is thus closest to the additional lens section 30 in the shown embodiment.

The main lens section 35 is designed as a diverging lens section 34 in the shown embodiment so that only the diverging lens section 34 is referred to in the following for the purpose of simplification. The embodiment design however applies likewise to a main lens section 35 that does not act as a diverging lens, but rather as a converging lens. This applies to all embodiments.

Viewed from the electro-optical component 14, the converging lens section 36 covers a solid angle that is smaller than the solid angle of the diverging lens section 34. In other words, the diverging lens section 34 is larger than the converging lens section 36.

For example, the ratio of the solid angle of the converging lens section 36 to the solid angle of the diverging lens section 36 is ¼ or lower.

The diverging lens section 34 has an interior wall that is formed concavely. Incidentally, the interior wall of the diverging lens section 34 is a free form.

In the case that the main lens section 35 acts as a converging lens, the interior wall is designed convexly and is incidentally a free form.

In contrast to the diverging lens section 34, the interior wall of the converging lens section 36 is designed convexly and can otherwise also be a free form.

The transition between diverging lens section 34 and converging lens section 36 is abrupt, i.e. the contour of the interior wall is not always continuously differentiable at the transition 38.

Together with the reflection surface 16, the diverging lens section 34 of the depression 26 forms a lens of the lens section 24. The reflection surface 16 and the interior wall of the depression 26 are to this end the refracting surfaces of this lens.

A diverging lens is thus formed by the diverging lens section 34 and the reflection surface 16, said diverging lens refracts ambient light that is incident across a wide angular range on the ambient side 20 to the electro-optical component 14.

The ray path of all rays that hit the electro-optical component 14, thus here the light receiver, is drawn in FIG. 2. This ray path is identical to a ray path that forms when the electro-optical component 14 is a light source.

Rays of the ambient light $S_U$ are refracted first on the reflection surface 16, thus on the ambient side 20 of the lens body 12, and travel towards the depression 26.

The ambient light $S_U$ travels then towards the diverging lens section 34 and is refracted there again in such a way that the ambient light $S_U$ completely falls on the electro-optical component 14.

The interior wall of the diverging lens section 34 can be spherical in order to collect the ambient light $S_U$ uniformly. In the shown embodiment, the diverging lens section 34 is however a free form that has be selected in such a way that the ambient light $S_U$ is captured more from certain angular ranges.

In addition to the rays of the ambient light $S_U$, the ray path also comprises the rays $S_A$ that travel through the converging lens section 36 of the depression 26 and are regarded as blocked out rays $S_A$.

The blocked-out rays $S_A$ travel between the lens body 12 and the electro-optical component 14 in the solid angle that is to be blocked out.

Viewed from the electro-optical component 14, the blocked-out rays $S_A$ travel on the converging lens section 36 and are refracted by the converging lens section 36 in such a way that they fall on the reflection surface 16 flatly.

The form of the converging lens section 36 can be selected in such a way that the rays $S_A$ in the lens body 12 travel parallelly after they have passed through the converging lens section 36.

The blocked-out rays $S_A$ now hit the reflection surface 16 at an angle of incidence α, wherein the angle of incidence α is defined as the angle between the ray $S_A$ and the perpendicular to the reflection surface 16.

The angle of incidence α is greater or the same as the critical angle $θ_c$ of the total internal reflection at the reflection surface 16, wherein the boundary surface for the total internal reflection is the interface between air and the material of the lens body 12. The critical angle $θ_c$ arises from the following known formula:

$$θ_c = \arcsin\left(\frac{n_L}{n_1}\right)$$

To this end, $n_1$ is the refractive index of the material of the lens body 12 and $n_L$ the refractive index of air.

As the angle of incidence α is greater or the same as the critical angle $θ_c$ of the total internal reflection, the blocked-out rays $S_A$ are reflected completely at the reflection surface 16 and do not leave the lens body 12.

Rays, which are not drawn in FIG. 2, are prevented by the nontransparent layer 28 from reaching the component 14.

Thus, there are no rays that lead to the electro-optical component 14 from the angular range W that is to be blocked out and is drawn with dashed lines in FIG. 2. Consequently, the angular range W is blocked out.

Thus, the reflection surface 16 and the converging lens section 36 of the depression 26 interact in such a way that light from a predetermined angular range W, which is to be blocked out, does not reach the electro-optical component 14.

Figure 5:
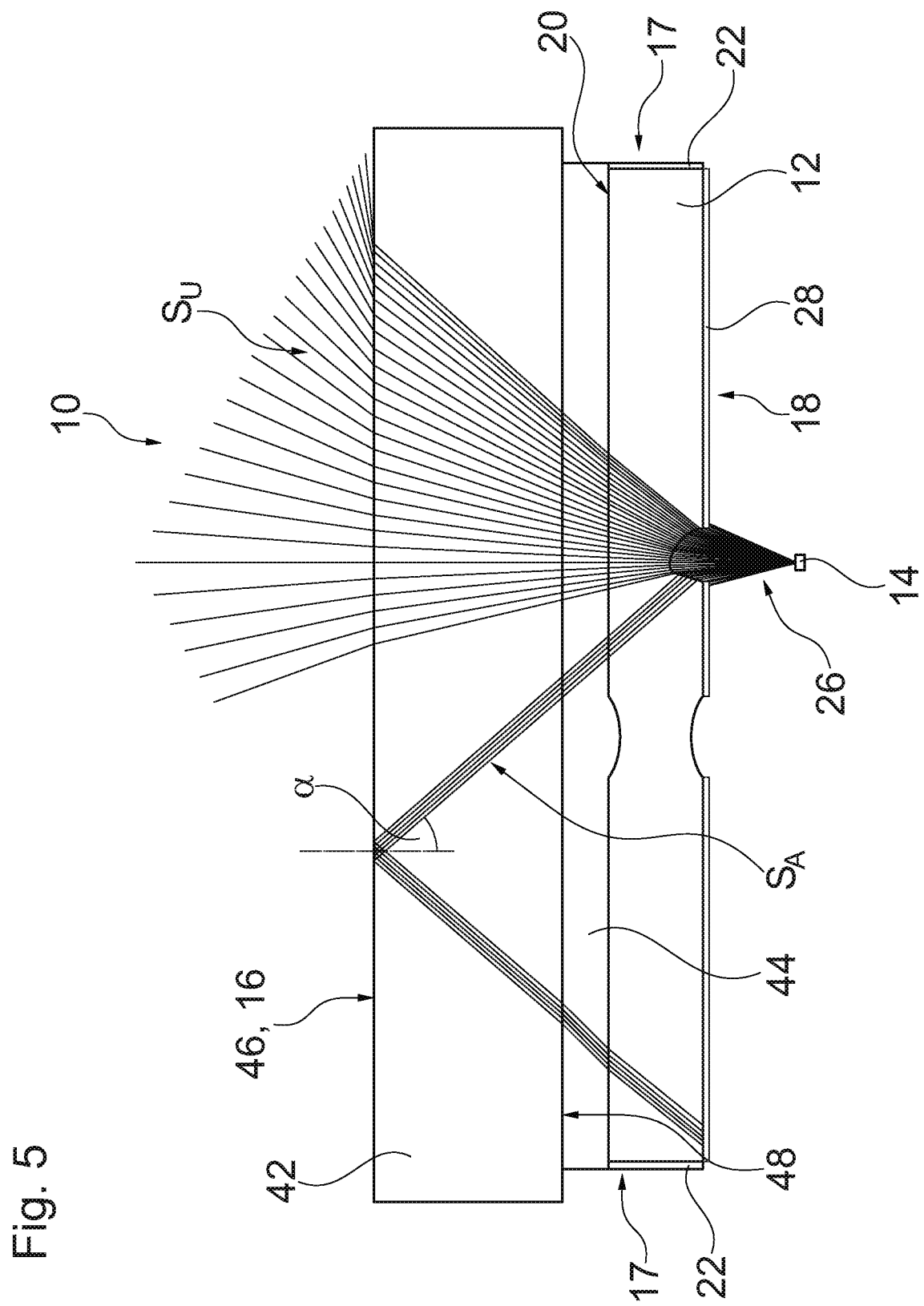
FIG. 5 shows a further embodiment of an electro-optical assembly according to the disclosure schematically in section.

In FIG. 5, a second embodiment of an electro-optical assembly 10 according to the disclosure is shown that substantially corresponds to the electro-optical assembly 10 of the first embodiment. Therefore, only the differences are discussed hereinafter and the same parts and parts with the same function are provided with the same reference signs.

The electro-optical assembly 10 of the second embodiment comprises a pane 42 that may be, for example, a windshield or another pane of the vehicle.

The pane 42 has an exterior side 46 and an interior side 48, on which the lens body 12 is attached with its ambient side 20.

In the shown embodiment, the attachment occurs by means of a transparent silicone layer 44 that is provided between the pane 42 and the ambient side 20 of the lens body 12.

In this second embodiment, the reflection surface 16 is not formed by the ambient side 20 of the lens body 12, but rather by the exterior side 46 of the pane 42 facing away from the electro-optical component 14.

Accordingly, the boundary surface of the total internal reflection is now the interface between the material of the pane 42 and air. If the refractive index of the material of the pane 42 differs from the refractive index of the material of the lens body 12, this results in, compared to the first embodiment, another critical angle $\theta_c$ of the total internal reflection. The critical angle is now:

$$\theta_c = \arcsin\left(\frac{n_L}{n_2}\right),$$

wherein $n_2$ is the refractive index of the material of the pane 42 and $n_2 > n_L$ applies.

Even in this case, the form of the converging lens section 36 is selected in a such a way that the blocked-out rays $S_A$ travel through the converging lens section 36 and are reflected completely at the reflection surface 16, here therefore the exterior side 46 of the pane 42.

In both embodiments, in particular however in the second embodiment, it is conceivable that the reflection surface 16, thus the ambient side 20 of the lens body 12 and/or the exterior side 46 of the pane 42, is curved. This curvature can also be taken into account by the form of the converging lens section 36 to such effect that a total internal reflection of the blocked-out rays $S_A$ occurs nevertheless on each point of the reflection surface 16. Thus, a curvature does not constitute a problem in principle, but rather only a problem of the precise calculation and production of the converging lens section 36 of the lens body 12.

For this reason, it is useful to select the angle of incidence α considerably larger than the critical angle $\theta_c$ in order to be able to compensate for a certain degree of inaccuracies due to production tolerances.

The invention claimed is:

1. Electro-optical assembly, comprising a reflection surface, a lens body and an electro-optical component,
   wherein the lens body includes an ambient side, a component side and a lens section, wherein a depression in the lens body extending from the component side is provided in the lens section, said depression forms together with the reflection surface in the lens section a lens for the electro-optical component,
   wherein the depression includes a main lens section and a converging lens section with a convex interior wall,
   wherein the interior wall of the converging lens section is formed in such a way that rays of a ray path travelling through the-converging lens section to the reflection surface hit the reflection surface in such way that the angle of incidence at the reflection surface is larger or equal to the critical angle of the total internal reflection at the reflection surface, and
   such that incident ambient light is blocked out from a predetermined angular range, as the blocked incident ambient light cannot reach the electro-optical component via the converging lens section.

2. Electro-optical assembly according to claim 1, wherein the main lens section is or comprises a diverging lens section with a concave interior wall.

3. Electro-optical assembly according to claim 1, wherein electro-optical component includes a light receiver.

4. Electro-optical assembly according to claim 1, wherein the ambient side of the lens body forms the reflection surface.

5. Electro-optical assembly according to claim 1, wherein the electro-optical assembly comprises a pane on which the lens body is mounted, wherein the side of the pane facing away from the electro-optical component forms the reflection surface.

6. Electro-optical assembly according to claim 5, wherein the pane is a windshield of a vehicle.

7. Electro-optical assembly according to claim 1, wherein the interior wall of the converging lens section is formed in such a way that the rays of the ray path, which travel via the reflection surface through the converging lens section to the electro-optical component, travel parallelly between the reflection surface and the converging lens section.

8. Electro-optical assembly according to claim 1, wherein the depression comprises an aperture towards the component side, wherein the depression extends completely within a notional cylinder, whose base area is the aperture of the depression.

9. Electro-optical assembly according to claim 8, wherein the cross-sectional areas of the depression parallel to the component side become increasingly smaller starting from the component side.

10. Electro-optical assembly according to claim 1, wherein a solid angle covered by the converging lens section is smaller than a solid angle covered by the main lens section.

11. Electro-optical assembly according to claim 1, wherein at least one of the converging lens section and the main lens section extend from the component side of the lens body.

12. Electro-optical assembly according to claim 1, wherein the transition between the main lens section and the converging lens section is abrupt.

13. Electro-optical assembly according to claim 1, wherein the depression has a vertex, wherein the electro-optical component is on a straight line that extends through the vertex and perpendicular to the component side of the lens body.

14. Electro-optical assembly according to claim 3, wherein the light receiver is on a straight line that extends through a vertex and perpendicular to the component side of the lens body.

15. Electro-optical assembly according to claim 1, wherein at least one of the component side, the ambient side and the reflection surface are parallel to each other.

16. Electro-optical assembly according to claim 1, wherein a nontransparent layer is provided on the component side at least partially.

17. Electro-optical assembly according to claim 1, wherein the lens body comprises a further lens section, wherein the converging lens section is formed at least at the point of the depression that is nearest to the additional lens section.

18. Electro-optical assembly according to claim 1, wherein electro-optical assembly comprises a housing that surrounds at least the lens body partially, wherein the housing adjoins the lens body laterally.

19. Method for detecting ambient light with the electro-optical assembly according to claim 1 comprising the following steps:
  detecting ambient light by means of the electro-optical assembly wherein the depression and the reflection surface interact so that incident ambient light on the electro-optical assembly is blocked out from a predetermined angular range.

20. Method according to claim 19,
  wherein the rays of the ray path that correspond to the blocked-out light are refracted at the depression in such a way that they are completely reflected at the reflection surface due to total internal reflection.

\* \* \* \* \*